(12) United States Patent
Horiuchi

(10) Patent No.: US 8,743,240 B2
(45) Date of Patent: Jun. 3, 2014

(54) IMAGING APPARATUS AND IMAGING METHOD

(75) Inventor: Satoshi Horiuchi, Kanagawa (JP)

(73) Assignee: Samsung Electronics Co., Ltd (KR)

( * ) Notice: Subject to any disclaimer, the term of this patent is extended or adjusted under 35 U.S.C. 154(b) by 42 days.

(21) Appl. No.: 13/331,643

(22) Filed: Dec. 20, 2011

(65) Prior Publication Data

US 2012/0154629 A1    Jun. 21, 2012

(30) Foreign Application Priority Data

Dec. 20, 2010   (JP) ................................. 2010-283671

(51) Int. Cl.
*H04N 9/73* (2006.01)
*H04N 3/14* (2006.01)
*H04N 5/235* (2006.01)
*G06K 9/34* (2006.01)

(52) U.S. Cl.
USPC ..................... 348/226.1; 348/296; 348/221.1; 348/222.1; 382/164

(58) Field of Classification Search
CPC ......... H04N 9/73; H04N 5/228; H04N 5/235; H04N 3/14; H04N 5/238; G06K 9/34; G06K 9/38; G06K 9/40
USPC ........ 348/226.1, 362, 221.1, 371, 447, E5.11, 348/222.1, 296, 367; 382/164–167, 171, 382/172, 173, 274
See application file for complete search history.

(56) References Cited

U.S. PATENT DOCUMENTS

| | | | |
|---|---|---|---|
| 7,667,740 B2 * | 2/2010 | Hofer | 348/226.1 |
| 2002/0158971 A1 * | 10/2002 | Daiku et al. | 348/226.1 |
| 2003/0112343 A1 * | 6/2003 | Katoh et al. | 348/226.1 |
| 2005/0093996 A1 * | 5/2005 | Kinoshita | 348/226.1 |
| 2009/0096902 A1 * | 4/2009 | Kobayashi | 348/296 |
| 2009/0128683 A1 | 5/2009 | Matsumoto | |
| 2010/0013953 A1 * | 1/2010 | Niikura | 348/226.1 |
| 2010/0123810 A1 * | 5/2010 | Greenland et al. | 348/294 |

FOREIGN PATENT DOCUMENTS

| | | |
|---|---|---|
| JP | 2006121605 | 5/2006 |
| JP | 2009130531 | 6/2009 |
| JP | 2010520673 | 6/2010 |

* cited by examiner

*Primary Examiner* — Tuan Ho
*Assistant Examiner* — Marly Camargo
(74) *Attorney, Agent, or Firm* — The Farrell Law Firm, P.C.

(57) ABSTRACT

Disclosed is an imaging apparatus with a flicker detector that restrains an increased calculation amount and image quality degradation. The apparatus includes a frame rate controller for setting a frame rate of an acquired image to a first frame rate or different second frame rate, a luminance calculator for calculating a first luminance difference between two images of a first group continuously acquired at the first frame rate and a second luminance difference between two images of a second group continuously acquired at the second frame rate, and a flicker detector for comparing the first and second luminance differences with first and second threshold, respectively, and determining whether flickers of a first frequency and a different second frequency are generated or not.

9 Claims, 13 Drawing Sheets

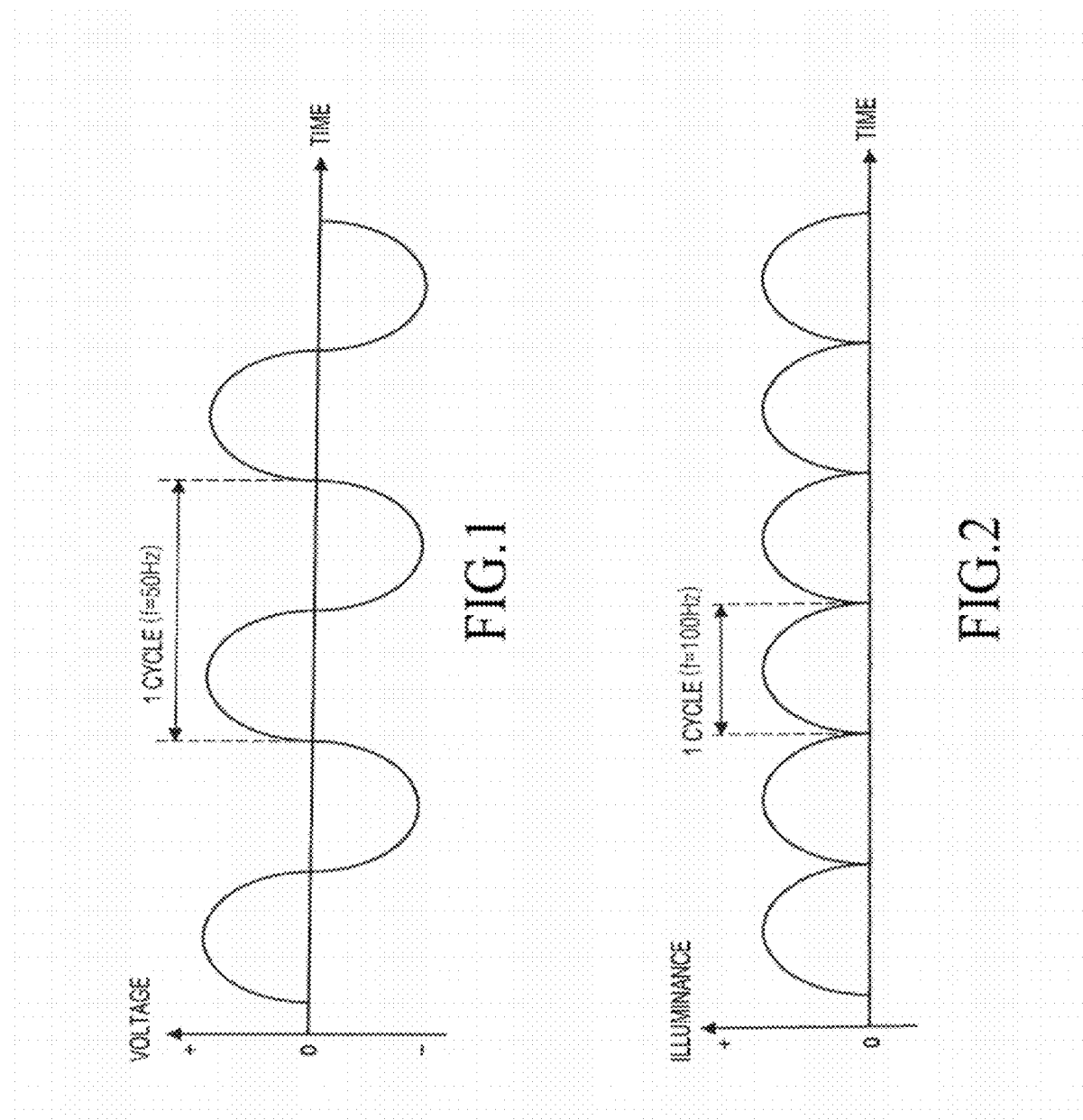

IMAGING APPARATUS AND IMAGING METHOD

PRIORITY

This application claims priority under 35 U.S.C. §119(a) to an application filed in the Japanese Patent Office on Dec. 20, 2010, and assigned Serial No. 2010-283671, the contents of which are incorporated herein by reference.

BACKGROUND OF THE INVENTION

1. Field of the Invention

The present invention generally relates to an imaging apparatus and an imaging method, and more particularly to an imaging apparatus having an automatic exposure function, and an image method.

2. Description of the Related Art

When an image is photographed using an electronic imaging apparatus, such as a digital camera, in an interior environment that is illuminated by a fluorescent light, an illuminance of a subject being photographed will occasionally change periodically, causing luminance noise in the photographed image. The periodic changes in the illuminance of the subject is referred to herein as a flicker. The luminance noise generated in the image by the flicker is referred to herein as flicker noise. An example of flicker noise includes a luminance difference generated between continuous frames of a moving image. Another example of flicker noise includes a stripe pattern generated on a photograph of the image.

Accordingly, technologies of detecting flickers have been suggested. For example, Japanese Patent Application Publication No. 2006-121605 discloses detecting a flicker by use of an index inducing a differential for average luminance values of a plurality of frame images photographed for a predetermined time period. Japanese Patent Application Publication No. 2009-130531 discloses specifying a flicker frequency by frequency-analysis of a flicker component extracted from differential images produced in two frames photographed at a frame rate. However, in Japanese Patent Application Publication No. 2009-130531, the frame rate cannot be synchronized with a power frequency of a light source. Also, when a flicker is detected using an average luminance value of images between a plurality of frames as described in Japanese Patent Application Publication No. 2006-121605, many frame images are required, increasing an amount of calculation. Further, when a frequency analysis is used to specify a flicker frequency, as described in Japanese Patent Application Publication No. 2009-130531, the frequency analysis also increases an amount of calculation.

Japanese Patent Application Publication No. 2010-520673 discloses extracting a flicker component based on a difference between luminances of images photographed for an exposure time synchronized with a period of a flicker and another exposure time respectively in a Complementary Metal Oxide Semiconductor (CMOS) device. However, when a flicker component is extracted by varying an exposure time, as described in Japanese Patent Application Publication No. 2010-520673, a degradation of an image quality due to a change in exposure time cannot be avoided.

SUMMARY OF THE INVENTION

Accordingly, the present invention has been made to solve the above-mentioned problems occurring in conventional devices, and an aspect of the present invention provides an improved imaging apparatus which can detect a flicker properly while restraining an increase in an amount of calculation and a degradation of an image quality, and an improved image method.

In accordance with an aspect of the present invention, there is provided an imaging apparatus including a frame rate controller for setting a frame rate of a image acquired by an imaging device to a first frame rate or to a second frame rate, with the first frame rate being different from the second frame rate; a luminance difference calculator for calculating a first luminance difference which is a luminance difference between two images of a first group of images continuously acquired by the imaging device at the first frame rate and a second luminance difference which is a luminance difference between two images of a second group of images continuously acquired by the imaging device at the second frame rate; and a flicker detector for comparing the first luminance difference and the second luminance difference with a first threshold and a second threshold, respectively, and determining whether one of flickers of a first frequency and a second frequency is generated, with the first frequency and the second frequency being different from each other.

In accordance with another aspect of the present invention, there is provided an imaging method including setting a frame rate of a image acquired by an imaging device to a first frame rate or a second frame rate, the first and second frame rates being different from each other; calculating a first luminance difference which is a luminance difference between two images of a first group of images continuously acquired by the imaging device at the first frame rate and a second luminance difference which is a luminance difference between two images of a second group of images continuously acquired by the imaging device at the second frame rate; and comparing the first luminance difference and the second luminance difference with a first threshold and a second threshold respectively and determining whether one of flickers of a first frequency and a second frequency is generated, with the first frequency and the second frequency being different from each other.

BRIEF DESCRIPTION OF THE DRAWINGS

The above and other aspects, features and advantages of the present invention will be more apparent from the following detailed description taken in conjunction with the accompanying drawings, in which:

FIG. 1 is a graph illustrating an example of a voltage change of an AC power;

FIG. 2 is a graph illustrating an example of an illuminance change of a light source;

DETAILED DESCRIPTION OF EMBODIMENTS OF THE PRESENT INVENTION

Figure 3:
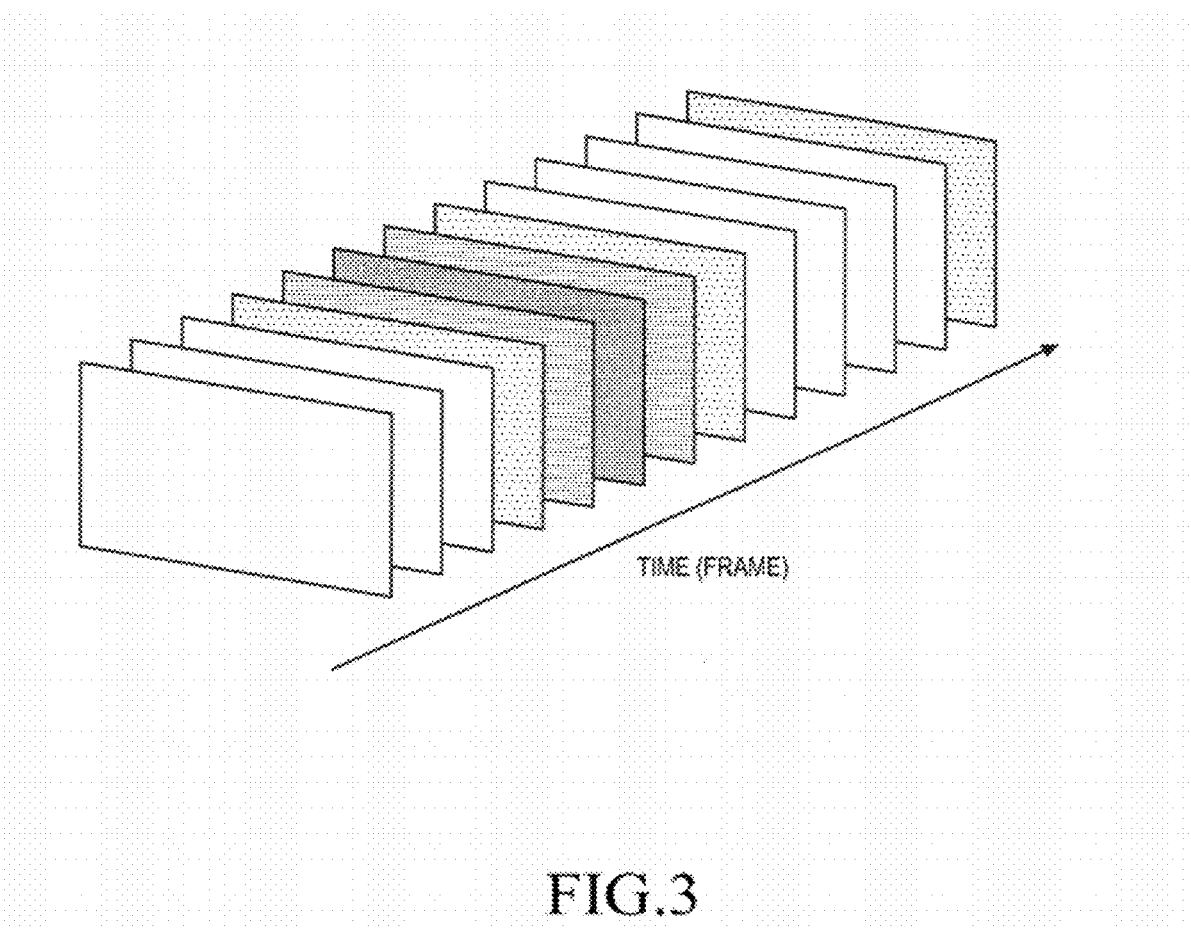
FIG. 3 illustrates an example of a surface flicker.

Hereinafter, embodiments of the present invention will be described in detail with reference to the accompanying drawings. In the following description of the present invention and the drawings, the same or like reference numerals denote the elements having substantially the same functional configurations, and a description thereof will not be repeated.

The principle of generation of a flicker is first described. As described above, a flicker refers to a periodic change in an illuminance of a subject. An illuminance change of a subject is caused by an illuminance change of a light source, and an illuminance change of a light source is caused by a voltage change.

FIG. 1 is a graph illustrating an example of a voltage change of an AC power. As illustrated in FIG. 1, a voltage change in Alternating Current (AC) power corresponds to a sine wave. Since a frequency of AC power is generally 50 Hz or 60 Hz, a voltage change of the AC power shows a sine wave of a frequency (f=50 Hz), or a sine wave of a frequency (f=60 Hz). The illustrated example corresponds to a frequency of f=50 Hz.

FIG. 2 is a graph illustrating an example of a luminance change of a light source. Luminance of a light source to which an AC power is supplied periodically changes at a frequency twice that of the AC power. As mentioned above, since a frequency of a general AC power is 50 Hz or 60 Hz, a luminance frequency of the light source becomes twice that of the applicable AC power, i.e. a frequency of f=100 Hz or f=120 Hz. The illustrated example corresponds to a case where a luminance of the light source is changed at a frequency of f=100 Hz.

As in the example of FIG. 2, a flicker is caused by a light source whose luminance is changed periodically. Hereinafter, such a light source will be referred to as a flicker light source. Since a luminance of a subject is periodically changed together with a luminance of the flicker light source, a flicker frequency becomes identical to a frequency of a luminance change of the flicker light source. Accordingly, when AC power is used for a power of the light source, the flicker frequency generally becomes 100 Hz or 120 Hz. Hereinafter, a flicker whose frequency is 100 Hz is referred to a 100 Hz flicker and a flicker whose frequency is 200 Hz is referred to a 200 Hz flicker Here, types of flicker noise generated in images by flickers will be described with reference to Table 1. Table 1 represents types of imaging devices, e.g. a CMOS or Charge Coupled Device (CCD), which can generate flicker noise and describes a summary of flicker noise for the types of the flicker noise.

TABLE 1

| Types of Flicker noise | Types of Imaging Devices | Summary |
| --- | --- | --- |
| Surface Flicker | CCD/CMOS | An average luminance of a CCD is periodically changed for frames when a moving image is photographed. In a CMOS, a line flicker is changed to be moved upward and downward when a moving image is photographed. |

TABLE 1-continued

| Types of Flicker noise | Types of Imaging Devices | Summary |
| --- | --- | --- |
| Line Flicker | CMOS | A horizontal stripe pattern is generated when a stop image is photographed by using a rolling shutter manner. |

FIG. 3 illustrates an example of a surface flicker. Specifically, FIG. 3 illustrates a surface flicker generated when an imaging device is a CCD, with an average luminance of continuous frames shown in a row.

Figure 4:
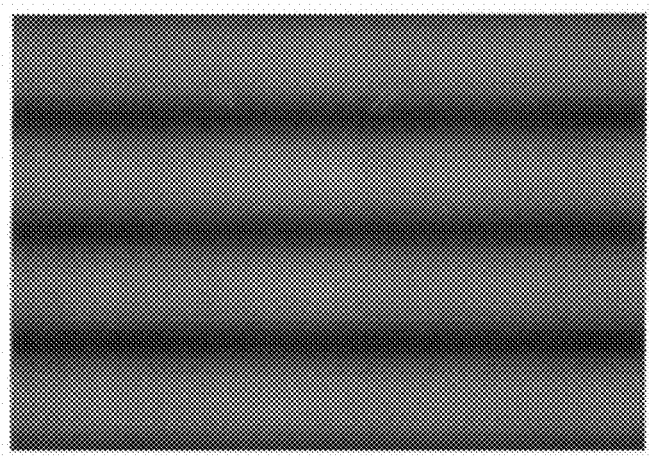
FIG. 4 illustrates an example of a line flicker.

FIG. 4 illustrates an example of a line flicker. As illustrated in FIG. 4, if a line flicker is generated when an imaging device is a CMOS, a luminance of an image is changed vertically, causing a horizontal stripe pattern.

Next, a cause of various types of flicker noise will be described.

Figure 5:
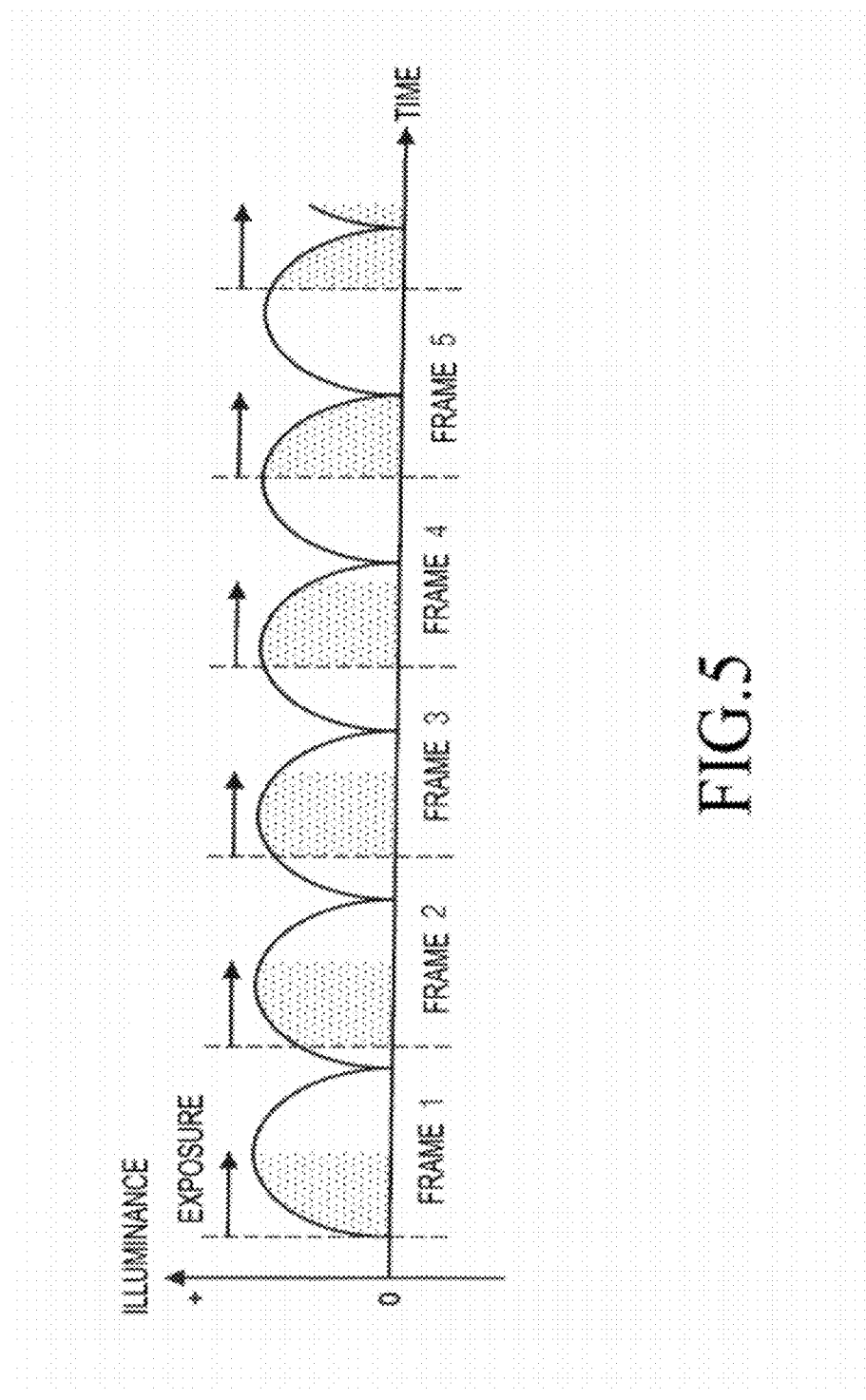
FIG. 5 explains a cause of a surface flicker.

FIG. 5 explains a cause of a surface flicker. A surface flicker is caused by different luminance phases of a subject when frames are photographed. When an illuminance of a subject is periodically changed, phase changes of the illuminance are different within exposure time ranges of the frames indicated by arrows. Thus, luminance integrations for an amount of exposure, i.e. an exposure time, are different except for a special case described below.

Figure 6:
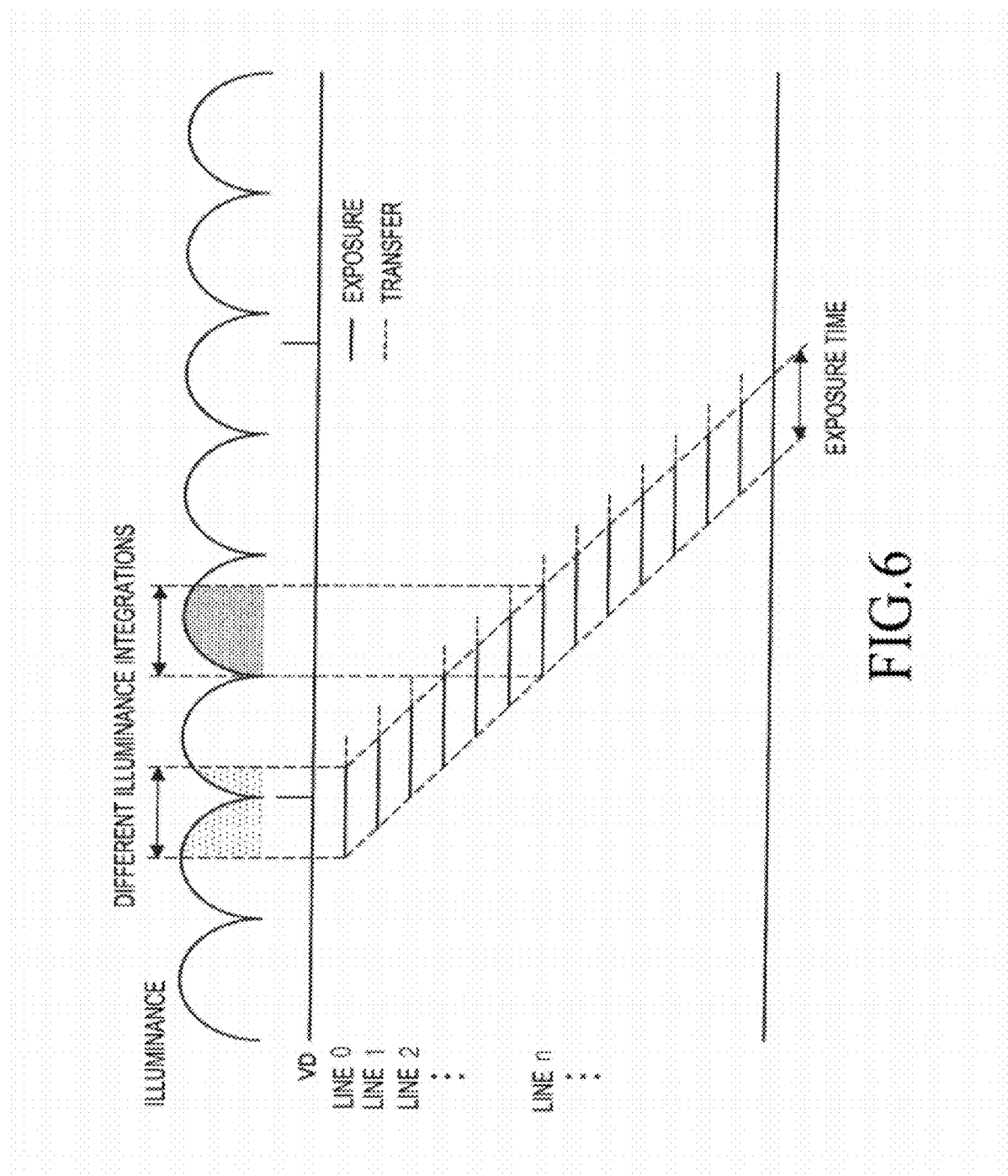
FIG. 6 explains a cause of a line flicker.

FIG. 6 explains a cause of a line flicker. A line flicker is caused by timing differences for scanning lines when an imaging device is a CMOS with a rolling type shutter. When a luminance of a subject is periodically changed, phase changes of a luminance differ in an exposure time line for scanning lines sequentially exposed by a rolling shutter. The luminance integrations for an exposure time are different except for the special case described below. As a result, luminance for scanning lines is periodically changed, generating line flickers in an image. The illustrated example shows that the illuminance integrations for an exposure time are different between a line zero (0) and a line n.

Next, the cases where flicker noise of any type is not generated will be described.

Figure 7:
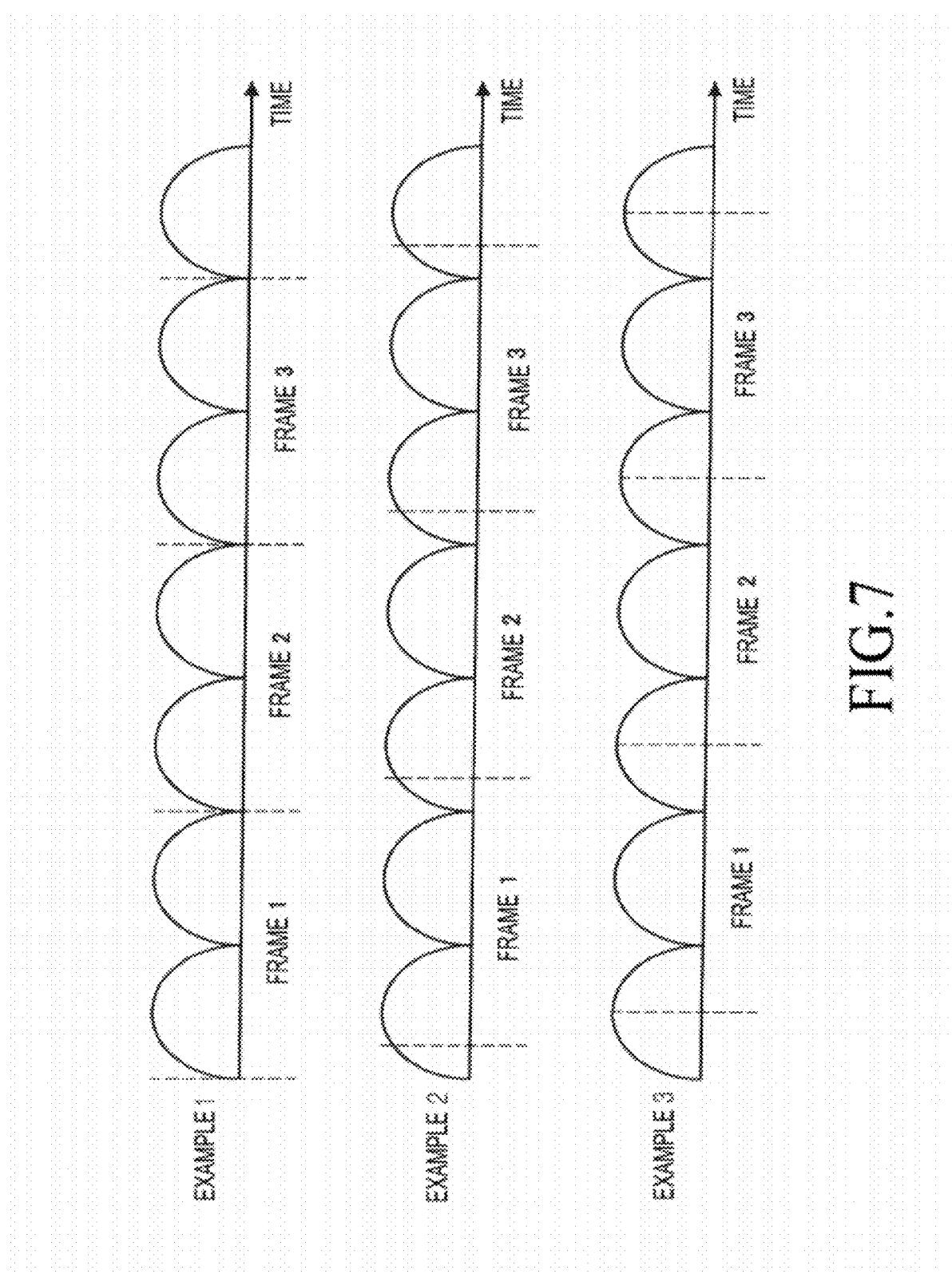
FIG. 7 explains a case in which surface flicker is not generated.

FIG. 7 explains a case in which surface flicker is not generated. As described in regards to FIGS. 1 to 3, when a frame interval of the photographed image is a natural number that is a multiple of a luminance change period of a subject, a surface flicker is not generated. In this case, phase changes of an illuminance become identical within exposure time ranges for frames. Thus, illuminance integrations for exposure times are identical in the frames. As a result, a surface flicker is not generated. However, a line flicker can be generated even in this case. When a frame interval is a natural number that is a multiple of a luminance change period of a subject, a frame rate, i.e. a reciprocal number of the frame intervals, is 1/n (with n being a natural number) of a frequency, i.e. a reciprocal number of an illuminance change period of the subject. Hereinafter, this case will be also referred to as a case where a frame rate is synchronized with a flicker frequency.

Figure 8:
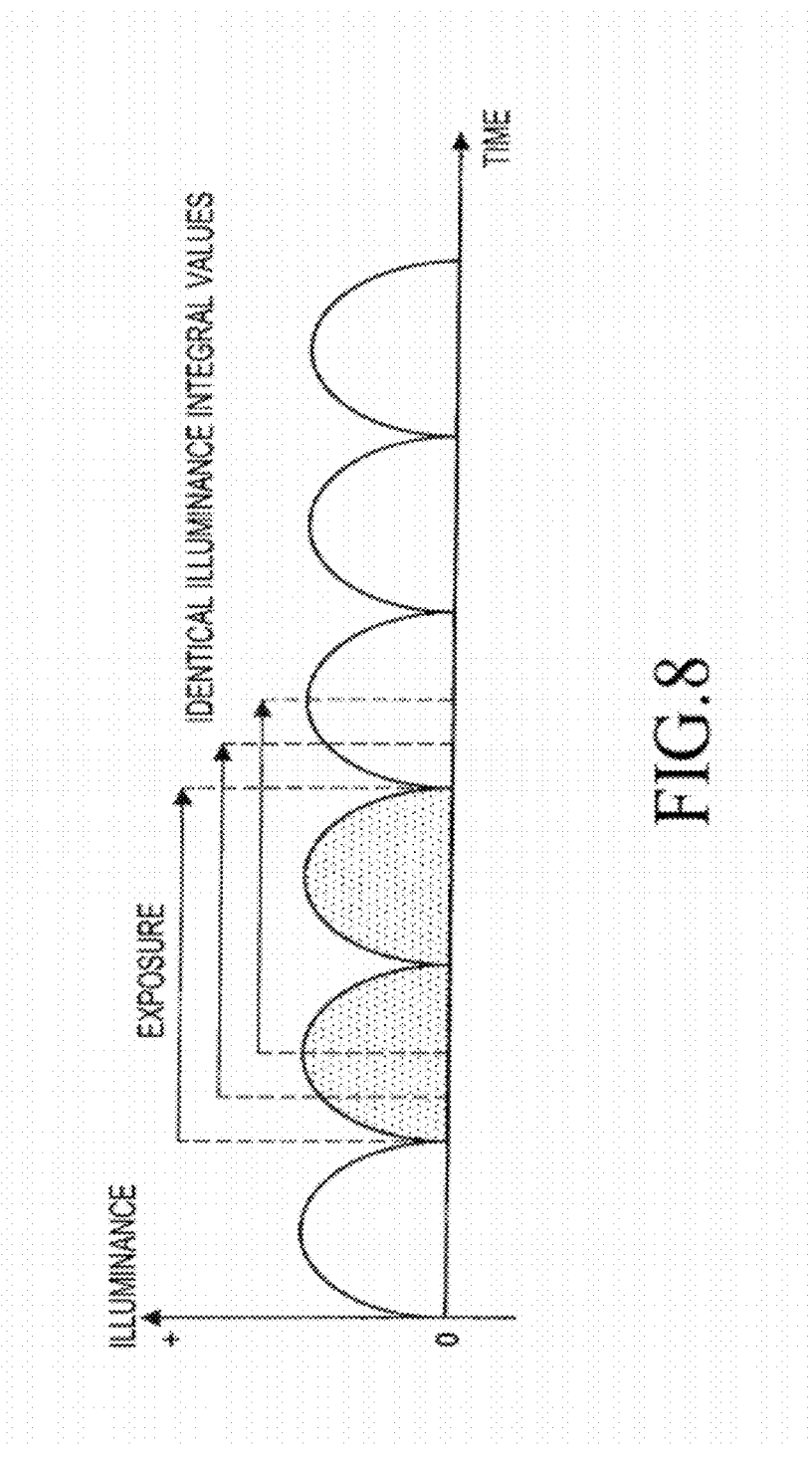
FIG. 8 explains a case in which line flicker is not generated.

FIG. 8 explains a case in which line flicker is not generated. As illustrated in FIG. 8, when an exposure time is a natural number corresponding to an illuminance change period of a subject, a line flicker is not generated. In this case, although phase changes of the illuminance are different within exposure time ranges for scanning lines, the illuminance integrations during the exposure time are identical for scanning lines. As a result, a line flicker is not generated. In this case, since illuminance integrations within the exposure time range are identical for the plurality of frames, a surface flicker is not generated. The exposure time of a natural number that is a multiple of a luminance change period of a subject is also referred to as a case where the exposure time is synchronized with a flicker period.

A related technology for detecting a flicker is now described. Here, in the below-described related technology, a generated flicker can be detected by using a plurality of frame images.

Figure 9:
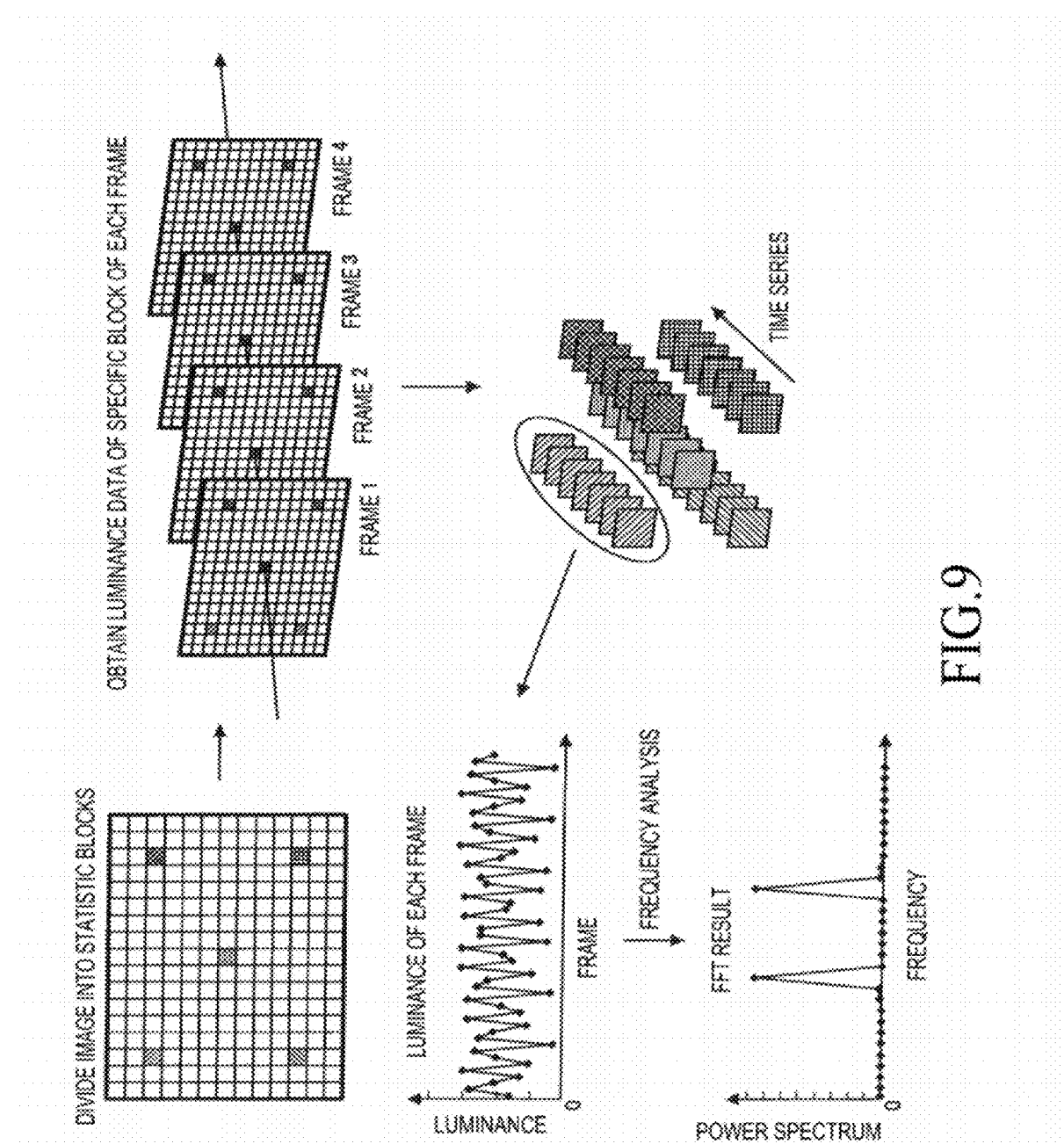
FIG. 9 illustrates an example of a related technology for detecting a surface flicker.

FIG. 9 illustrates a related technology of detecting a surface flicker. In the related technology for detecting a surface flicker, a flicker frequency is estimated by frequency-analyzing an entire image in a plurality of frames or frequency-analyzing an average luminance of a specific portion. In the example illustrated in FIG. 9, the images in the frames are divided into statistic blocks of a predetermined size. Next, a plurality of specific blocks are set among the statistic blocks of the frames. Thereafter, luminance data in the plurality of frames which are continuous in a time series for the specific blocks are obtained. The luminance changes for the plurality of frames in the obtained specific blocks are frequency-analyzed, for example, by Fast Fourier Transform (FFT) analysis. Accordingly, a power spectrum representing flicker frequencies is obtained, and existence of a surface flicker and a flicker frequency is determined.

However, a relatively large number of frames should be analyzed to frequency-analyze luminance changes in the plurality of frames. For example, as in the illustrated example, 16 or more frames should be analyzed during an analysis through FFT.

Since the frequency analysis itself is a complex calculation in the above-mentioned method, an amount of processing calculations will increase. Although a peak count for luminance can be used instead of a frequency analysis, a detection degree of a flicker is reduced.

Figure 10:
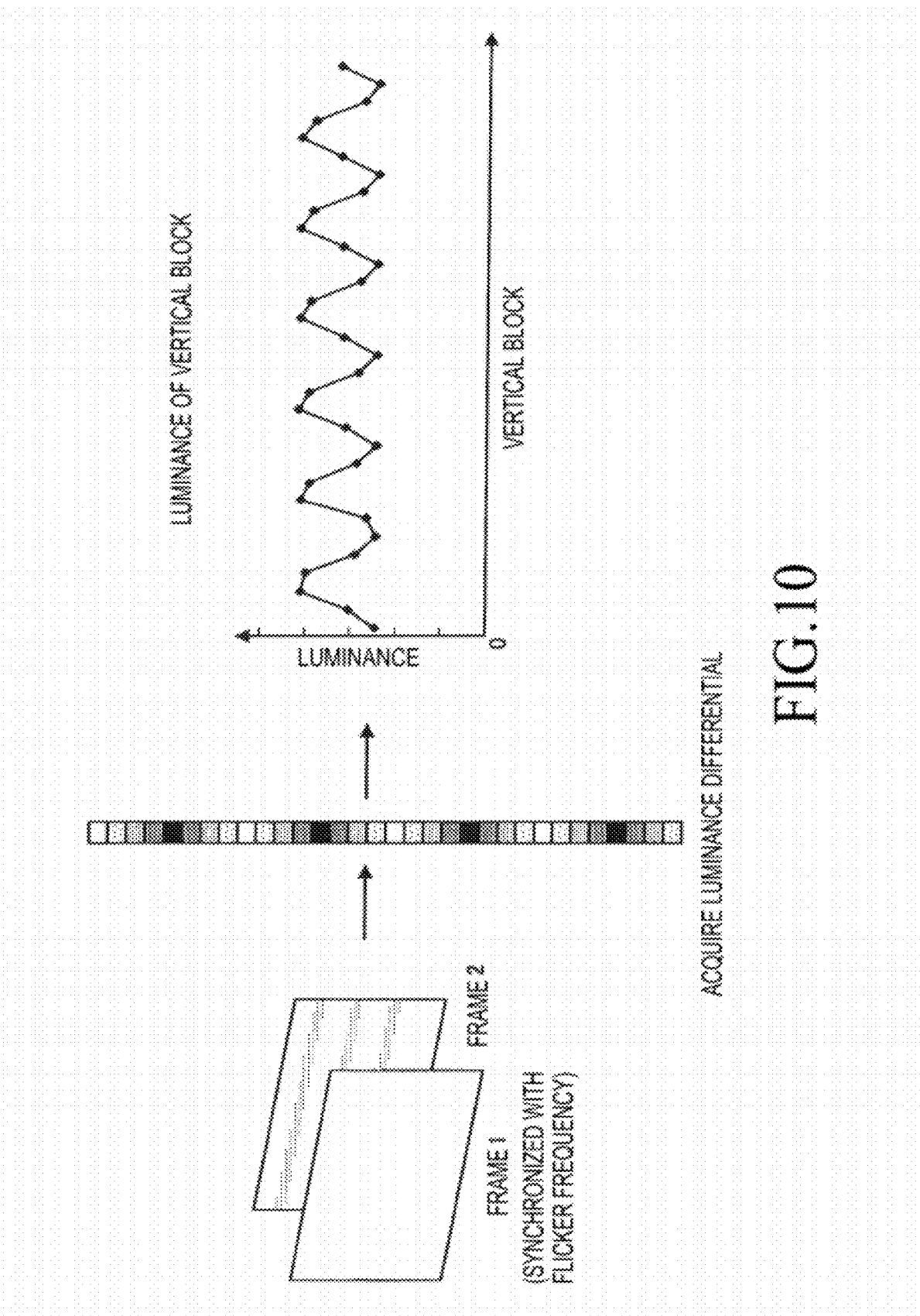
FIG. 10 illustrates an example of a related technology for detecting a line flicker.

FIG. 10 illustrates a related technology for detecting line flicker. In a related technology for detecting line flicker, an existence of a line flicker is estimated from luminance differences between a plurality of frames with different exposure times. In the illustrated example, a luminance differential is determined between Frame 1 whose exposure time is 1/100 seconds and Frame 2 whose exposure time is 1/90.

Here, as described with reference to FIG. 2, an illuminance of a light source is assumed to periodically change at a frequency of f=100 Hz. In this case, as illustrated with reference to FIG. 8, since an exposure time is synchronized with a flicker period in Frame 1 whose exposure time is 1/100 seconds, illuminance integrations for the scanning lines during the exposure time are identical, and a line flicker is not generated.

Meanwhile, an exposure time is not synchronized with a flicker period in Frame 2 whose exposure time is 1/90. An exposure time of Frame 2 is not synchronized with a flicker period even when an illuminance of the light source periodically changes at a frequency of F=120 Hz. In this case, as luminances of scanning lines periodically change in Frame 2, a line flicker is generated in an image. If a luminance differential is obtained for blocks that are continuous vertical between Frame 1 and Frame 2, a periodic luminance change is extracted as a flicker component.

Figure 11:
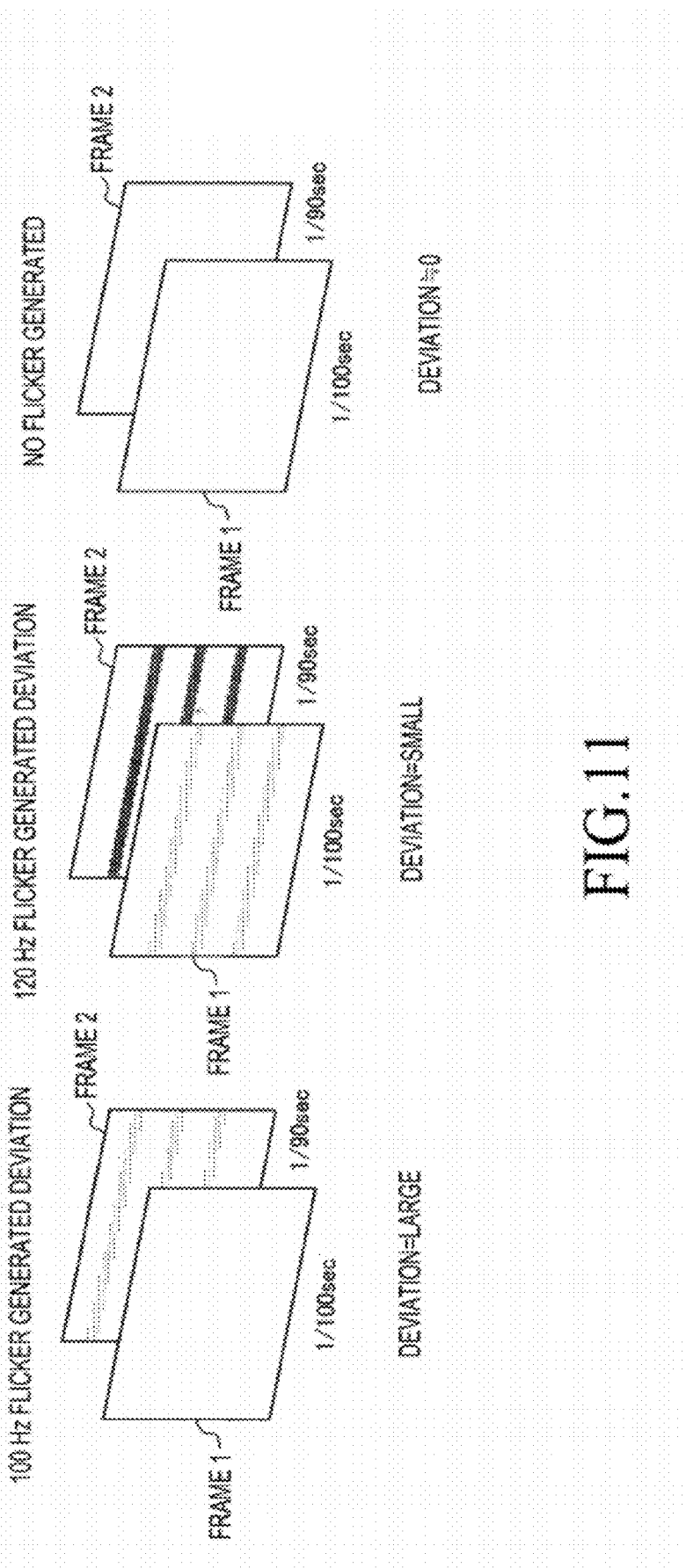
FIG. 11 illustrates cases of generating a line flicker and of not generating a line flicker in the example of FIG. 10.

FIG. 11 is a view illustrating a case of generating a line flicker and a case of not generating a line flicker, as in the example of FIG. 10. When a flicker of 100 Hz is generated, a line flicker is not generated in Frame 1, whose exposure time is 1/100 seconds, but a line flicker is generated in Frame 2 whose exposure time is 1/90 seconds. Meanwhile, when a flicker of 120 Hz is not generated, line flickers are generated in Frame 1 and Frame 2 respectively.

When a flicker of 100 Hz is generated, luminances of vertically continuous blocks are periodically changed but will not change in Frame 1. For this reason, a luminance differential between Frame 1 and Frame 2 whose deviation changes in response to the magnitudes of the flicker components generated in Frame 2 is a relatively large value. Meanwhile, when a flicker is not generated, luminances of vertically continuous blocks are not changed in Frame 1 and Frame 2. For this reason, a luminance differential between Frame 1 and Frame 2 is rarely changed and a deviation becomes a value close to zero. For the two cases, an existence of a flicker can be easily determined by comparing a deviation of luminance differentials between frames with, for example, a threshold such as a value slightly larger than zero.

However, when a flicker of 120 Hz is generated, the luminances of the vertically continuous blocks are changed in both Frame 1 and Frame 2. For this reason, a luminance differential between Frame 1 and Frame 2 whose deviation changes in response to the magnitudes of the flicker components generated in Frame 2 is a relatively small value. In this case, if an existence of a flicker is determined by comparing luminance differential deviations between frames with a threshold, a threshold needs to be set between a relatively small deviation in the case of generating a flicker of 120 Hz and zero, and it is difficult to set a suitable threshold as compared with a case of generating only a flicker of 100 Hz.

In this regard, an exposure time is set to synchronize with both a flicker frequency of 100 Hz and a flicker frequency of 120 Hz, for example, to set a frame using 1/20 seconds. However, the exposure time is not applied to a general frame rate, e.g. 30 frames per second (fps). For this reason, in the example, two frames are combined to correspond to both an illuminance change frequency of 100 Hz and an illuminance change frequency of 120 Hz. For example, four frames changed for exposure times of 1/100 seconds, 1/90 seconds, 1/120 seconds, and 1/90 seconds are used to detect a flicker.

When exposure times change between a plurality of frames, a sensitivity is changed to compensate for a change in exposure time. However, a sensitivity change may degrade an image quality. Accordingly, as a frame whose exposure time is changed to detect a flicker is not used, an image quality may be prevented from being degraded. However, for example, as mentioned above, when a flicker is detected from four frames in response to two illuminance change frequencies, only one frame is displayed for four frames. So, if a frame rate is 30 fps, a frame omission of 1/30 seconds×4 frames 133 milliseconds is generated.

Imaging Apparatus According to the Present Invention

A construction of an imaging apparatus according to an embodiment of the present invention is described below. For example, the imaging apparatus according to the embodiment may be a video camera. Further, the imaging apparatus may be another device, which has an imaging function, such as a compact digital camera capable of photographing a dynamic image. The imaging apparatus according to the embodiment of the present invention sets an image frame rate, which is obtained by the imaging apparatus, as a first or a second frame rate synchronized with a flicker frequency to reduce an amount of operations and degradation of an image quality for a flicker detection.

Figure 12:
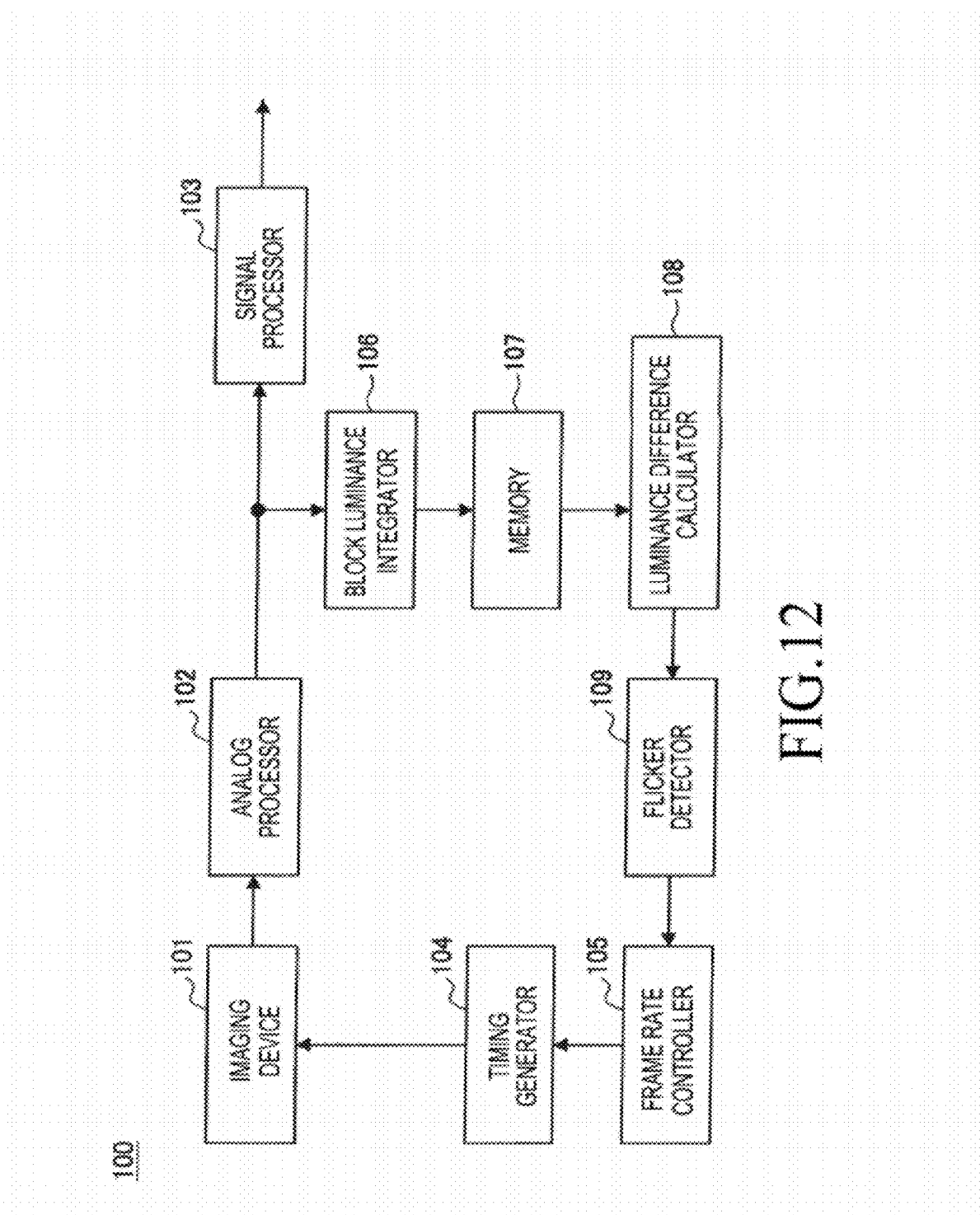
FIG. 12 is a block diagram of components of an imaging apparatus according to an embodiment of the present invention.

FIG. 12 is a block diagram illustrating components of the imaging apparatus 100 according to an embodiment of the present invention. The imaging apparatus 100 includes an imaging device 101, an analog processor 102, a signal processor 103, a timing generator 104, a frame rate controller 105, a block luminance integrator 106, a memory 107, a luminance difference calculator 108, and a flicker detector

109. The aforementioned elements, other then the imaging device 101, may be implemented by using a Digital Signal Processor (DSP) and dedicated hardware. Further, a Central Processing Unit (CPU) is operated based on a program installed in a memory device (not shown), so that the elements may be implemented as software.

The imaging device 101, i.e. image sensor, outputs an image signal, which is generated by photo-electrically converting an optical image, i.e. subject image, incident in an optical system such as a lens (not shown), to the analog processor 102 to acquire an image. The imaging device 101 may be, for example, a CMOS or a CCD device.

The analog processor 102 processes an image signal input by the imaging device 101 and outputs raw data to the signal processor 103 and the block luminance integrator 106. The analog processor 102, for example, removes a low frequency noise included in an electric signal through a Correlated Double Sampling (CDS) circuit and amplifies the electric signal via an amplifier.

The signal processor 103 converts the raw data input provided by the analog processor 102 to analog/digital data to acquire a digital image signal including Red, Green and Blue (R, G, and B) image signals. The signal processor 103 outputs the acquired image signal to store or display an imaging image in the imaging apparatus 100.

The timing generator 104 is controlled by the frame rate controller 105 and generates various pulses for operating the imaging device 101 to supply the generated pulses to the imaging device 101. For example, a photographing capability of the imaging device 101, that is, a frame rate of an image signal output by the imaging device 101 is determined by a pulse supplied from the timing generator 104.

The frame rate controller 105 controls the timing generator 104 to set an image frame rate acquired by the imaging device 101. The frame rate controller 105 can set different frame rates for each frame. The frame rate controller 105 sets the image frame rate acquired by the imaging device 101 as a first frame rate or a second frame rate.

The block luminance integrator 106 acquires a luminance integration in each of a plurality of blocks generated by dividing an image by using raw data input by the analog processor 102, to output an acquired luminance integration to the memory 107.

The memory 107 stores the luminance integration of each block of an image input through the block luminance integrator 106.

The luminance difference calculator 108 calculates a luminance difference between luminance difference integrations of blocks of two images provided by the block luminance integrator 106, as stored in the memory 107, and outputs a flicker to the flicker detector 109. For a first image group successively acquired with a first frame rate by the image device 101 and a second image group acquired with a second frame rate by the imaging device 101, the luminance difference calculator 108 calculates a luminance difference between two images as a first luminance difference or a second luminance difference, and outputs the calculated luminance difference to the flicker detector 109.

The flicker detector 109 determines whether a flicker is being generated based on input of the luminance difference input from the luminance difference calculator 108. The flicker detector 109 compares the first luminance difference and the second luminance difference with a first threshold and a second threshold, respectively, and then determines whether one of flickers of a first frequency and a second frequency, which are different from each other, is being generated, or determines whether neither of the flickers is being generated.

In the embodiments of the present invention described above, the first frequency corresponds to 100 Hz, and the second frequency corresponds to 120 Hz. Further, the flicker detector 109 can output an instruction of the frame rate to the frame rate controller 105 for a flicker re-detection operation.

Method of Imaging According to the Present Invention

Further details of an operation of the imaging apparatus according to an embodiment of the present invention will be described below.

Figure 13:
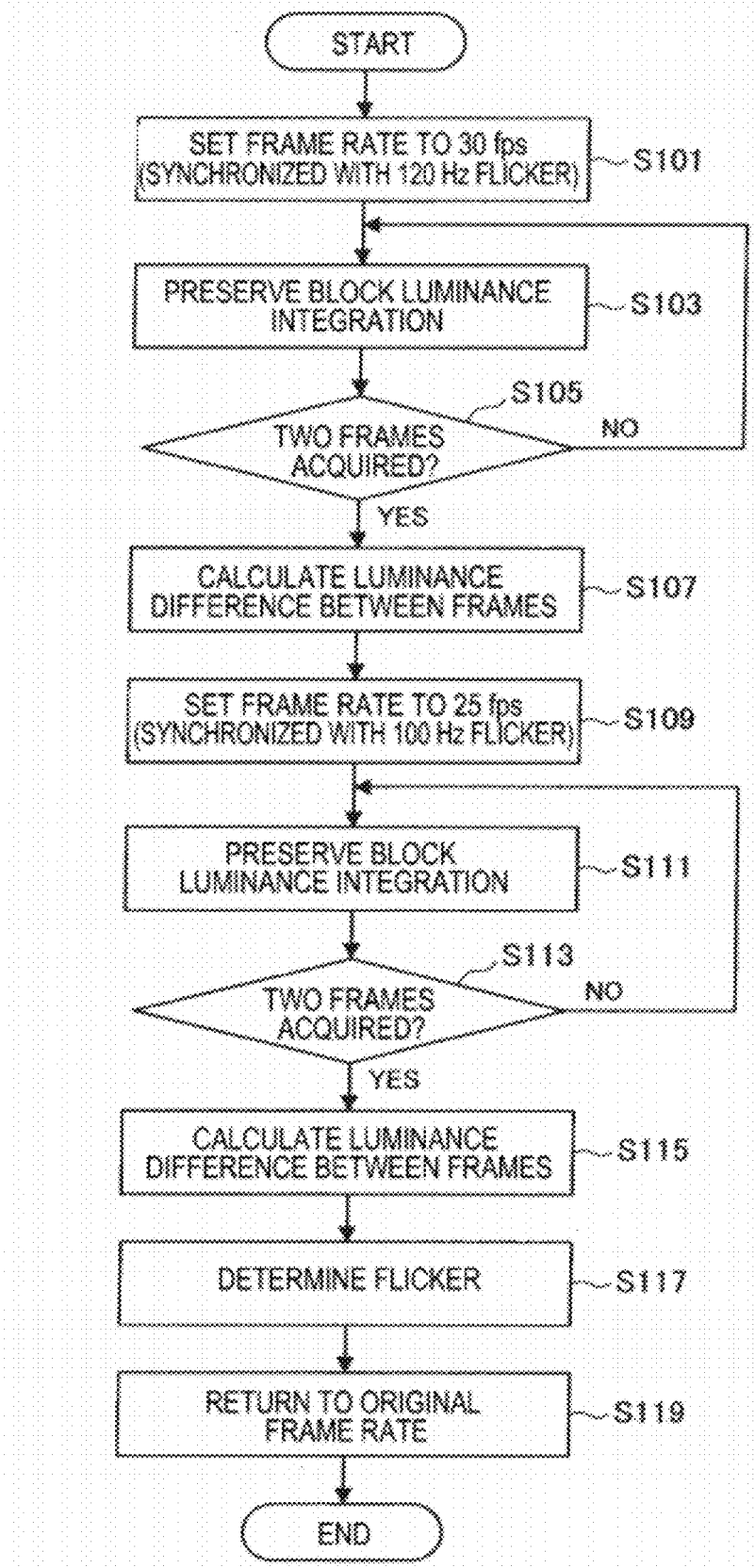
FIG. 13 is a flowchart illustrating a method of operation of the imaging apparatus.

FIG. 13 is a flowchart illustrating a method of operation of the imaging apparatus 100, in particular a process in which the imaging apparatus 100 photographs an image of four (4) frames and a flicker is detected in the photographed image. In the following example, a frame rate of the imaging apparatus 100 for general photographing corresponds to 30 fps.

First, a process of photographing an image of two (2) frames and detecting a flicker of 100 Hz in the photographed image is performed. The frame rate controller 105 configures a frame rate to thirty (30) fps in step S101. The rate of thirty (30) fps refers to a frame rate synchronized with a frequency of a flicker of 120 Hz. Further, if the flicker frequency is f in Hertz (Hz) and n is a natural number, a frame rate (FR) in fps synchronized with the flicker frequency is defined by Equation (1):

$$FR = \frac{f}{n} \quad (1)$$

In Equation (1), the frame rate of the imaging apparatus 100 in general photographing corresponds to 30 fps, as described above. A frame rate closest to the frame rate in general photographing among frame rates synchronized with a frequency of a flicker of 120 Hz is FR-30 fps corresponding to a frequency of f=120 Hz and n=4 in Equation (1). Further, when the imaging apparatus 100 moves to step S101 in general photographing, the frame rate in general photographing is already 30 fps, so that step S101 may not be performed.

As described above, by setting the frame rate to 30 fps, generation of a flicker of 100 Hz in which a frequency is not synchronized with the frame rate is detected. Further, as described with reference to FIG. 8, when a charge accumulation time corresponds to an integer multiple of a flicker period, a flicker noise is not generated regardless of the frequency, and the generation of the flicker is not detected. Accordingly, a charge accumulation time $t_e$ (seconds) is defined by Equation (2) based on an assumption that a flicker frequency is f (Hz) and n is a natural number, with a frequency of f=100 Hz.

$$t_e \neq \frac{n}{f} \quad (2)$$

Next, the block luminance integrator 106 acquires and stores a block luminance integration in memory 107 in step S103. Here, the acquisition of the block luminance integration in step S103 will be additionally described with reference to FIG. 14.

Figure 14:
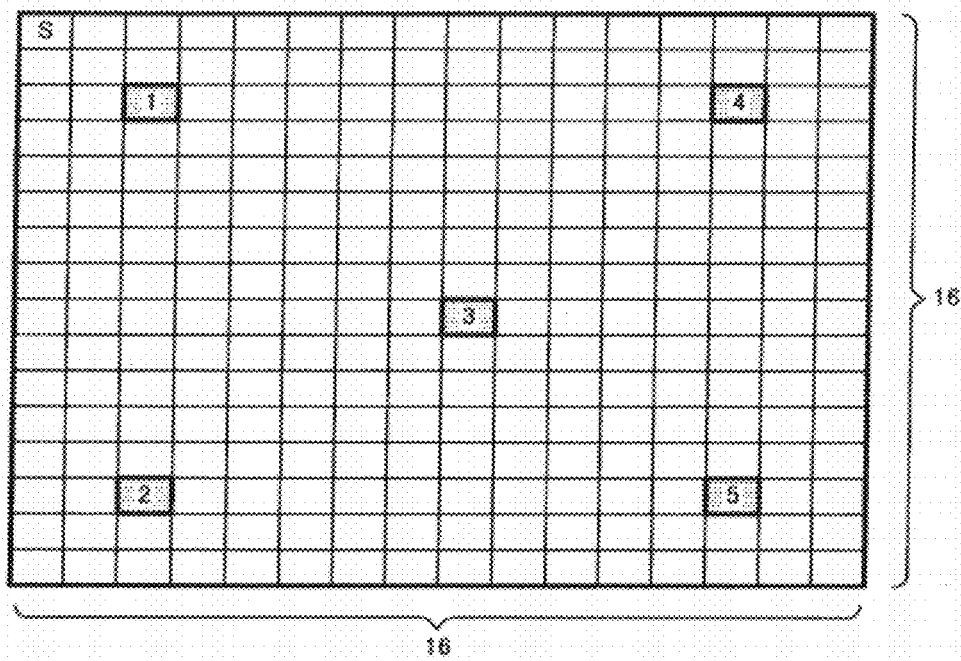
FIG. 14 illustrates a division of blocks and an example of extracted blocks according to an embodiment of the present invention.

FIG. 14 illustrates an example of block division and an extracted block according to an embodiment of the present invention. Referring to FIG. 14, the block luminance integrator 106, for example, divides an image into 256 blocks of 16×16 (length×width), and acquires a block luminance integration of each block. Here, the block luminance integrator 106 may extract some blocks from the 256 blocks in order to reduce a memory 107 capacity and an operation amount, and to acquire a luminance integration in the extracted blocks as a block luminance integration for storage in the memory 107. In an illustrated, 5 blocks, numbered as 1 to 5, correspond to extracted blocks. The block luminance integrator 106 does not set an extracted block, and may acquire block luminance integrations for all blocks to store in memory 107. Further, as illustrated in the embodiments, the block luminance integrator 106 does not set the extracted block in a fixed position, and may set a block corresponding to a feature point in an image processing as an extracted block.

Referring back to FIG. 13, when a block luminance integration for two frames is obtained by the block luminance integrator 106 to be preserved in the memory 107 in step S105, the luminance difference calculator 108 calculates the luminance difference between frames in step S107. Meanwhile, when the obtained and preserved block luminance integration not acquired for two frames, a block luminance integration is obtained and preserved in the next frame in step S103.

Here, the luminance difference calculator 108 calculates a luminance difference index value $D_b$ for frames of the blocks according to Equation (3) in the block luminance integrations $S_1$ and $S_2$ of the two frames. In Equation (3), b is an index of an extracted block, corresponding, for example, to numbers 1 to 5 given to the extracted blocks in the example of FIG. 14. Accordingly, as a luminance difference index value Db for frames increases, a luminance change for frames caused by the flicker also increases.

Equation (3) is:

$$D_b = \frac{|S_1 - S_2|}{(S_1 + S_2)/2} \quad (3)$$

Next, the images of the remaining two frames are photographed, and a processing for detecting a 120 Hz flicker is performed in the photographed image. The frame rate controller 105 sets a frame rate to 25 fps in step S109, with 25 fps as a frame rate synchronized with a frequency of a 100 Hz flicker. As mentioned above, a frame rate of the imaging apparatus 100 is generally 30 fps. If a frame rate closest to the frame rates synchronized with a frequency of a 100 Hz flicker is obtained, FR becomes 25 fps when a frequency f=100 Hz and n=4 in Equation (1) above.

A generation of a 120 Hz flicker whose flicker frequency is not synchronized with a frame rate is detected by setting the frame rate to 25 fps. As in the case of detecting a 100 Hz flicker, a charge accumulating time $t_e$ (seconds) is set to satisfy Equation (2) above, with the frequency of Equation (2) of f=120 Hz.

Hereinafter, as in the case of detecting a 100 Hz flicker, the block luminance integrator 106 acquires and stores a block luminance integration in memory 107 in step S111, and acquires block luminance integrations for two frames for storage in the memory 107 in step S113, the luminance difference calculator 108 calculating a luminance difference between frames in step S115.

Subsequently, an existence of a flicker is determined when the flicker detector 109 compares a luminance difference index value $D_b$ for frames with a threshold in step S117. When a flicker is generated, a condition for satisfying a luminance difference index value Db between frames is represented as in Equation (4) using the threshold, which is a set value adjusted according to brightness.

Equation (4) is:

$$D_b \geq \text{Threshold} \quad (4)$$

Using Equation (4), an existence of a flicker is determined for a luminance difference index value $D_b$ between frames for detecting a 100 Hz flicker, which is calculated in step S107, and a luminance difference index value $D_b$ between frames for detecting a 120 Hz flicker, as calculated in step S115, is determined. A threshold may be a first threshold compared with a luminance difference index value $D_b$ between frames for detecting a 100 Hz flicker and a luminance difference index value $D_b$ between frames for detecting a 120 Hz flicker. The first threshold and the second threshold may be different or identical.

Similar luminance values between frames satisfying Equation (4) determine that flicker noise is generated. Here, when a frame rate is synchronized with a flicker frequency, flicker noise is not generated. Thus, when a generation of flicker noise is shown by a luminance difference index value $D_b$ between frames calculated as a frame rate of 30 fps synchronized with a flicker frequency of 120 Hz in step S107, a generated flicker is a 100 Hz flicker. Likewise, when a generation of flicker noise is shown by a luminance difference index value $D_b$ between frames calculated as a frame rate of 25 fps synchronized with a flicker frequency of 100 Hz in step S115, a generated flicker is a 120 Hz flicker.

The flicker detector 109 may determine that flicker noise is generated when a luminance difference index value $D_b$ between frames in at least two blocks of the extracted blocks satisfies Equation (4) in order to prevent an erroneous detection. The flicker detector 109 may determine that flicker noise is generated when a luminance difference index value $D_b$ between frames in all the extracted blocks satisfies Equation (4). In the example of FIG. 14, it may be determined that flicker noise is generated in both the extracted blocks numbered 1 to 5 when Equation (4) is satisfied.

Table 2, below, provides an example of a collective flicker determining condition. Here, the indication of D≥Threshold represents that Equation (4) is satisfied in all extracted blocks. The other cases are indicated by an indication of D<Threshold. A luminance difference index value $D_b$ between frames when flickers with various flicker frequencies is indicated by $D_{100Hz}$ and $D_{120Hz}$.

TABLE 2

| | $D_{120Hz}$ < Threshold | $D_{120Hz}$ ≥ Threshold |
|---|---|---|
| $D_{100Hz}$ < Threshold | No flicker | 100 Hz |
| $D_{100Hz}$ < Threshold | 120 Hz | Detection of an error |

Next, in step S119, the frame rate controller 105 returns a frame rate to an original frame rate at step S101. When the imaging apparatus 100 returns to step S101 in a general photographing operation, the frame rate controller 105 returns the frame rate to 30 fps.

The embodiments herein assume a flicker frequency is 100 Hz or 120 Hz. As illustrated with reference to FIG. 2, a flicker frequency depends on a frequency of an AC power supplied to a light source. Thus, a flicker frequency becomes a value different from 100 Hz and 120 Hz in an area where a frequency of the supplied AC power deviates from 50 Hz or 60 Hz.

For example, as the frequency of an AC power deviates, it is thought to be a case where an original frequency of 100 Hz is deviates by 1% to 101 Hz. In this case, a luminance change of a maximum of 3.14% may be generated in an image photographed at a frame rate synchronized with a period of a 100 Hz flicker, with an expectation of zero. However, when a photographing operation is performed at a frame rate synchronized with a period of a 120 Hz flicker, a minimum value of a luminance change (flicker noise) between frames caused by a 101 Hz flicker is 13.4%. For this reason, when a 101 Hz flicker is generated, while a luminance change which can be generated in an image photographed at 25 fps is a maximum of 3.14%, a luminance change of at least 13.4% is generated in an image photographed at 30 fps. Thus, even when a frequency of an AC power deviates by 1%, flicker noise can be detected by using the imaging apparatus according to the embodiment of the present invention.

Even if the flicker frequency detected in the example is actually 101 Hz, it is determined as 100 Hz. For this reason, if a flicker is restrained according to the detection result, a luminance change of a maximum of 3.14% remains. However, the luminance change of 3.14% is converted to an Exposure value (Ev) of approximately 0.045 Ev, which is not recognizable by a human eye.

According to the imaging apparatus 100 of the embodiments of the present invention, a flicker frequency of a high precision can be detected with a simple structure without performing a complex calculation such as an frequency analysis. Further, since a charge accumulating time may not be changed, a flicker can be detected without degrading an image quality. A frame delay caused by changing a frame rate from 30 fps to 25 fps is 1/25-1/30≈6.67 milliseconds for one frame and is 13.3 milliseconds for two frames. This delay is 1/10 of a frame omission time of 133 milliseconds in the case of indicating one frame per every four frame at a frame rate of 30 fps in an example of changing an exposure time per each frame to detect a flicker, which has been described above. This degree of time delay cannot be easily recognized by a human eye.

While certain embodiments of the invention has been shown and described with reference to the accompanying drawings, the present invention is not limited thereto. It will be understood by those skilled in the art that various changes in form and details may be made therein without departing from the spirit and scope of the invention as defined by the appended claims and pertain to the technical scope of the invention.

For example, a first group of images continuously photographed at a first frame rate and a second group of images photographed at a second frame rate are illustrated by images of two frames, the present invention is not limited thereto. For example, the group of images may be images of three or more frames, and image of two frames may be extracted from them.

What is claimed is:

1. An imaging apparatus comprising:
   a frame rate controller for setting a frame rate of an image acquired by an imaging device to a first frame rate or to a second frame rate, with the first frame rate being different from the second frame rate;
   a luminance difference calculator for calculating a first luminance difference between two images of a first group of images acquired by the imaging device at the first frame rate and a second luminance difference between two images of a second group of images acquired by the imaging device at the second frame rate; and
   a flicker detector for comparing the first luminance difference and the second luminance difference with a first threshold and a second threshold, respectively, and determining whether a flicker of a first frequency or a flicker of a second frequency is generated, with the first frequency being different from the second frequency,
   wherein the first frame rate and the second frame rate are synchronized with the first frequency and the second frequency, respectively.

2. The imaging apparatus of claim 1, wherein the two images of the first group of images are continuously acquired by the imaging device at the first frame rate.

3. The imaging apparatus of claim 2, wherein the two images of the second group of images are continuously acquired by the imaging device at the second frame rate.

4. The imaging apparatus of claim 1, wherein the first frame rate of the first frequency is 1/n and the second frame rate of the second frequency is 1/m, wherein n is a natural number and m is a natural number.

5. The imaging apparatus of claim 4, wherein, when the first luminance difference is greater than or equal to the first threshold, the flicker of the first frequency is determined to have been generated.

6. The imaging apparatus of claim 5, wherein, when the second luminance difference is greater than or equal to the second threshold, the flicker of the second frequency is determined to have been generated.

7. The imaging apparatus of claim 1, further comprising a block luminance integrator for acquiring luminance integrations in a plurality of blocks obtained by dividing each image among the first group of images and the second group of images wherein the luminance difference calculator calculates the first luminance difference and the second luminance difference corresponding to each of the plurality of blocks.

8. The imaging apparatus of claim 7, wherein the block luminance integrator acquires the luminance integrations for a plurality of extracted blocks which are parts of the plurality of blocks,
   wherein, when the first luminance difference for at least two blocks of the plurality of extracted blocks is greater than or equal to the first threshold, the flicker detector determines that the flicker of the first frequency is generated, and
   wherein, when the second luminance difference for at least two blocks of the plurality of extracted blocks is greater than or equal to the second threshold, the flicker detector determines that the flicker of the second frequency is generated.

9. An imaging method comprising the steps of:
   setting a frame rate of an image acquired by an imaging device to a first frame rate or to a second frame rate, with the first frame rate being different from the second frame rate;
   calculating a first luminance difference between two images of a first group of images continuously acquired by the imaging device at the first frame rate and a second luminance difference between two images of a second group of images continuously acquired by the imaging device at the second frame rate; and
   comparing the first luminance difference and the second luminance difference with a first threshold and a second threshold, respectively, and determining whether a flicker of a first frequency or a flicker of a second frequency is generated with the first frequency being different from the second frequency, wherein the first frame rate and the second frame rate are synchronized with the first frequency and the second frequency, respectively.

* * * * *